UNITED STATES PATENT OFFICE 1,975,077

INORGANIC THERMOPLASTIC COMPOSITION

Willis A. Boughton, Cambridge, Mass., assignor to New England Mica Co., Waltham, Mass., a corporation of Massachusetts No Drawing. Application January 10, 1931, Serial No. 507,991

10 Claims. (Cl. 106—87)

This invention relates to inorganic thermoplastic compositions, which soften and become sufficiently plastic by the application of relatively moderate heat, for example, up to about 400° C. to be suitably manipulated or shaped, and which are resistant to practically all organic liquids, solvents, and compounds, and which when solid, are fairly resistant to water and non-corrosive aqueous solutions.

An object of the invention is to provide an inorganic reversibly thermoplastic composition which may be used as a luting or joining or sealing composition between a variety of substances, for example, metal pipe joints, glass pipe joints, terra cotta pipe joints, joints between dissimilar substances, etc., which are in contact with or convey organic liquids or similar products in commercial chemical manufacturing operations, also for certain types of linings, and for analogous uses.

A further object is to provide an inorganic reversibly thermoplastic composition which upon controlled heating will become sufficiently soft and plastic to form a seal and to firmly unite with other materials to form a perfect bond therewith, and which on cooling will stiffen and become highly viscous, or semi-solid, or solid, whereby fractures in chemical apparatus, etc., may be repaired, or several parts may be united into a unitary leak-proof apparatus, or covers luted to vessels, etc.

A further object is to provide a series of inorganic reversibly thermoplastic compositions which may be used as effective seals or lutes at particular temperatures; the composition becoming progressively fluid at increasing temperatures, and progressively viscous masses at decreasing temperatures until they are semi-solid to solid, thereby providing a great variety of compositions which function as seals under a great variety of operating conditions.

Other objects of the invention will be apparent to those skilled in the art upon reading the specification.

In the preparation of these inorganic thermoplastic composition, I have taken advantage of the property peculiar to only a very few inorganic substances of forming aqueous solutions which when heated under properly regulated conditions do not precipitate the dissolved salt, but become increasingly viscous as the water content becomes lower, until they form masses which on progressively cooling are glass-like solids or super-cooled fluids. The water present in these glass-like solids or super-cooled fluids may be described as being colloidally associated with the substance.

Examples of these few substances are the water soluble alkali metal metaphosphates, and metaborates, now better known as monoborates, for example, the potassium and sodium compounds, metaphosphoric acid, and alkali metal silicates. While such substances do not act alike in their temperature ranges of dehydration and viscosity, they have the same general properties herein described. For example, a dilute water solution of sodium metaphosphate is a mobile fluid at ordinary temperatures, much like that of any water soluble inorganic salt. But when this solution is concentrated under properly controlled conditions it remains a comparative mobile fluid up to temperatures well above 250° C. and at this temperature still contains approximately five percent of water; and when then cooled to about 150° C., it is so viscous that a thermometer may be rotated in the mass only with difficulty.

The cooled product is semi-solid to solid according to the water content, and in the absence of a more appropriate term to define its physical properties, it may be regarded as a more-or-less solid solution of the dissolved substance in water.

Similarly, a water solution of metaphosphoric acid when heated to boiling, boils continuously while the temperature rises gradually, and at a regular rate, above 100° C., losing the more tightly held water of association as the temperature rises. At 350° C. it still boils as a comparatively mobile fluid, although it contains only approximately five percent of water or less, and this mixture when cooled to 120° C. is so viscous that a thermometer may be rotated in the mass only with difficulty.

Commercial sodium silicate solution (water glass), for example, is viscous even at ordinary temperatures and cannot be used for the purposes described herein at temperatures above about 80° C. because of the intumescence that takes place due to the solidification. Consequently, thermoplastics covered by this invention, involving the use of sodium silicate solution must be used below about 80° C.

Therefore, as stated above, substances of the class described herein, and coming within the scope of this invention, give solutions having different ranges of temperature of dehydration and viscosity, but all can be treated so as to exhibit the peculiar property of not precipitating as they dehydrate, but yield solutions of increasing viscosity at lower temperatures.

In general these specially prepared cooled fluids act like organic thermoplastic solids, in that when they are again heated to the higher temperatures they again become fluid, just like asphalt. That is, the change from the fluid state to the solid state through a great range of viscosity is reversible, a property that is anomalous in the chemistry of simple inorganic substances.

These special solutions of high viscosity and low water content may under certain limited conditions themselves be used as reversible inorganic thermoplastics, but I prefer to mix with them various proportions of non-reacting finely powdered solid inorganic substances, such as kaolin, graphite, mica, talc, etc., to give greater substance to the mass and provide a body that is more easily worked and handled. Examples of compositions are given hereafter, but each composition will vary in percentage according to the particular use desired. For some purposes, a porous fabric such as burlap, may be saturated or coated with layers of the hot fluid and applied to a joint to be luted; or a layer of fluid may be applied to the joint, then a layer of saturated or unsaturated fabric, and if desired, a final coating of fluid.

In practice I make an aqueous solution of the inorganic water-soluble substance of the class herein described containing roughly from twenty percent to forty percent of solid substance, or I may take a solution containing two or more of such solid substances, and add thereto the desired amount of a finely divided non-reacting inorganic solid in the proportion by weight of about 2 to 4 parts to about 7 parts of the dissolved substance on a dry basis. This mixture is then stirred and heated until the temperature has reached the desired point when the mass is cooled and shaped into convenient forms while cooling. Such a mixture is a "plastic fluid", capable of inelastic deformation under stress, a viscous paste of putty-like or molasses-like consistency at the temperature at which it is to be used and is increasingly viscous as the temperature is lowered, for example like asphalt, and may be described as being relatively low-temperature-softening, viscous, stiff, asphalt-like in character becoming a highly viscous non-flowing stiff, deformation resisting solid at temperatures 50° C. to 200° C. below the liquid or putty-like point.

I find it desirable, furthermore, to vary the percentage of added non-reacting inorganic solid, for example, kaolin, depending on the temperature at which the plastic is to be applied as a seal. Thus for higher application temperatures the percentage of added solid is lower, down to only half or less of the quantity which is desirable when the temperature of application is lower.

For some purposes, I may use compositions containing two or more thermoplastic chemicals of the type herein described; for example, I may use a composition containing sodium metaphosphate, sodium tetraborate, kaolin, and mica powder in suitable proportions, which will vary with the particular object to be accomplished, and the resulting mass will have the desired thermoplastic properties herein described and claimed.

Examples illustrating several methods of preparing reversible thermoplastic compositions in accordance with this invention are as follows—

*Example 1.—Sodium metaphosphate composition*

Thirty-five grams of water soluble sodium metaphosphate are dissolved in from 100 to 200 cubic centimeters of water with the aid of controlled heat. With this solution is mixed approximately twenty-one grams of finely powdered mica. The application of heat is continued until the temperature is reached which will produce a mass having the desired degree of plasticity at the temperature of use. The desired degree of plasticity will vary with the particular use to which the product is to be applied and temperature of application; at a temperature of 110° C. the mass will contain approximately thirty-six percent of water; at a temperature of 125° C. the mass will contain approximately twenty percent of water; at a temperature of 150° C. the mass will contain approximately 5.8 percent water; and at a temperature of 200° C. the mass will contain approximately three percent of water. A mass showing thermoplastic properties at any desired temperature lower than or intermediate between any of these specified temperatures will be obtained by stopping the application of excess of heat at that temperature. The product obtained at a temperature of 110° C. will be found very efficient for one class of work in that it will be sufficiently plastic for application at that temperature, but will be semi-solid at lower or ordinary temperatures, and will thus produce an effective seal or lute in many types of chemical apparatus. The product obtained at 125° C. will be found to be efficient as a lute at temperatures above those at which the 110° C. product can be used; the product obtained at 150° C. will be found to produce an effective seal or lute at still higher temperatures, etc. The products obtained at the several temperatures will be found to be efficient for different classes of work in many chemical processes in which organic solvents or reagents are used, and which involve different temperatures and operations.

*Example 2.—Metaphosphoric acid composition*

Metaphosphoric acid is obtained commercially usually in the form of glassy sticks. Approximately thirty-five grams of this material are dissolved in 100 to 200 cubic centimeters of water with the application of controlled heat, and to the mixture is added approximately twenty grams of finely powdered mica. This mixture is heated and at 110° C. contains approximately thirty-two percent of water; at 125° C. approximately twenty-four percent of water; at 150° C. approximately fifteen percent of water and at 180° C. approximately three percent of water. Metaphosphoric acid is therefore adapted for different ranges of temperature and different classes of work than is sodium metaphosphate. However, the general principles of manufacture and application are the same as those previously cited.

*Example 3.—Sodium metaborate composition*

Sodium metaborate is dissolved in water and mixed with a finely powdered non-reacting powder such as talc, graphite, etc., and heated. The composition of the sodium metaborate seals are made in substantially the same way as the sodium metaphosphate compositions, and exhibit entirely analogous changes of properties, uses, and conditions of use as exist with the sodium metaphosphate composition.

*Example 4.—Mixed salts composition*

Quantities of sodium metaphosphate, and sodium tetraborate which is blendable therewith and exhibits reversibly thermoplastic properties when in combination with the metaphosphate, are dissolved in water and to the solution are added powders, for example, kaolin and powdered mica in suitable proportions which will vary with the particular object to be accomplished, and the mixed mass heated and treated in substantially the same way as in the examples above described; the resulting product exhibits entirely analogous changes of properties, uses, and conditions of use as exist with the other compositions herein described.

*Example 5.—Silicate of soda composition*

Ordinary water glass containing about forty percent of solid sodium silicate is mixed with approximately twenty grams of finely powdered graphite. At 80° C. this mixture contains approximately seventeen percent of water and is quite viscous. If heated to about 100° C. it loses to a large extent its thermoplastic properties and should be used at temperatures below 80° C.; accordingly, this mixture of sodium silicate and graphite is adapted to still other temperature ranges and conditions of use than the previous examples.

In using any of the thermoplastic compositions to seal or lute a joint in a pipe, the pipe surfaces are cleaned, and the suitably heated thermoplastic composition is applied with a trowel, for example as with mortar, or with a spatula, knife or other forming tool, coating the parts to be sealed, and upon cooling, the composition becomes a self-sustaining highly viscous body, effectively closing the joint. A similar procedure is followed when it is desired to seal a crack in a broken vessel.

All of the above described compositions are integral mixtures of a more-or-less solid solution of a soluble substance or substances in water of the class described which do not separate out on concentration, and a powdered inert non-soluble solid, and have the general property of being reversibly thermoplastic, and selected compositions may be used for special applications. All seals or joints made by these compositions may be opened upon the application of an excess of heat, and thereafter may be again sealed or luted as described above by cooling. When in the solid state, the product may be suitably pulverized, or the product may be molded into sticks, bars, etc., and packed for shipment.

I claim:

1. A composition of matter consisting of from about three percent to about six percent of water associated with metaphosphoric acid, which does not crystallize or separate out on cooling from a hot solution, said composition also containing an inert filler, and having the property of being reversibly thermoplastic.

2. A composition of matter consisting of from about three percent to about fifteen percent of water associated with metaphosphoric acid, which does not crystallize or separate out on cooling from a hot solution, said composition also containing an inert filler and having the property of being reversibly thermoplastic.

3. A composition of matter consisting of from about three percent to about six percent of water associated with sodium metaphosphate, which does not crystallize or separate out on cooling from a hot solution, said composition also containing an inert filler, and having the property of being reversibly thermoplastic.

4. A composition of matter consisting of from about three percent to about fifteen percent of water, associated with sodium metaphosphate, which does not crystallize or separate out on cooling from a hot solution, said composition also containing an inert filler, and having the property of being reversibly thermoplastic.

5. A composition of matter consisting of from about three percent to about ten percent of water, associated with a sodium metaborate which does not crystallize or separate out on cooling from a hot solution, said composition also containing an inert filler, and having the property of being reversibly thermoplastic.

6. A composition of matter containing about two parts by weight of a metaphosphate and about one part by weight of inert matter, said weights being on a dry basis, said composition containing from about three percent to about fifteen percent of water, said water being associated with said metaphosphate, said metaphosphate having the property of not crystallizing or separating out on cooling from a hot solution, said inert matter being intimately diffused through said water association of the metaphosphate, and said composition having the property of being reversibly thermoplastic.

7. A composition of matter containing about two parts by weight of a metaborate and one part by weight of inert matter, said weights being on a dry basis, said composition containing from about three percent to about fifteen percent of water, said water being associated with said metaborate, said metaborate having the property of not crystallizing or separating out from a hot solution, said inert matter being intimately diffused through said water association of the metaborate, and said composition having the property of being reversibly thermoplastic.

8. An inorganic reversibly thermoplastic sealing composition, consisting of a solid solution of water and at least one of the group of metaphosphoric acid, alkali metal metaphosphates, and alkali metal metaborates, mixed with a powdered inert solid, the water present being sufficient to produce a reversibly thermoplastic mass.

9. An inorganic reversibly thermoplastic sealing composition, consisting of a solid solution of water and at least one of the group of metaphosphoric acid, alkali metal metaphosphates, and alkali metal metaborates, mixed with a powdered inert solid, the water being present in from about three percent to about thirty-six percent of the resulting composition.

10. An inorganic reversibly thermoplastic sealing composition, consisting of a solid solution of water and at least one of the group of metaphosphoric acid, alkali metal metaphosphates, and a blendable alkali metal borate, mixed with a powdered inert solid, the water present being sufficient to produce a reversibly thermoplastic mass.

WILLIS A. BOUGHTON.